United States Patent

Sölve et al.

[11] Patent Number: 5,905,733
[45] Date of Patent: May 18, 1999

[54] METHOD AND APPARATUS FOR DISTINGUISHING IN-BAND SIGNALING FROM USER DATA

[75] Inventors: Torbjörn Wilson Sölve, Cary; Larry William Massingill, Selma, both of N.C.

[73] Assignee: Ericsson Inc., Reasearch Triangle Park, N.C.

[21] Appl. No.: 08/759,854

[22] Filed: Dec. 3, 1996

[51] Int. Cl.$^6$ ........................................ H04J 3/12
[52] U.S. Cl. ................................ 370/522; 370/326
[58] Field of Search ......................... 370/522, 524, 370/525, 321, 314, 324, 326, 337, 347, 349, 350, 342, 394, 229, 332, 465, 466, 442, 458, 468, 477, 498, 499, 503; 375/213, 214, 226, 231, 235, 355, 356, 362, 364, 368

[56] References Cited

U.S. PATENT DOCUMENTS

| | | | |
|---|---|---|---|
| 5,121,391 | 6/1992 | Paneth et al. | 370/341 |
| 5,233,634 | 8/1993 | Väisänen | 375/320 |
| 5,359,624 | 10/1994 | Lee et al. | 370/342 |
| 5,400,331 | 3/1995 | Lucak et al. | 370/401 |
| 5,493,571 | 2/1996 | Dengdahl et al. | 370/513 |
| 5,631,898 | 5/1997 | Dent | 370/373 |

FOREIGN PATENT DOCUMENTS

| | | |
|---|---|---|
| 0 651 523 | 10/1994 | European Pat. Off. . |
| 2 259 633 | 9/1992 | United Kingdom . |
| WO 96/11533 | 4/1996 | WIPO . |
| WO 96/42143 | 12/1996 | WIPO . |

OTHER PUBLICATIONS

PCT, Search Report, May 8, 1998 for PCT Application PCT/US 97/21986.

*Primary Examiner*—Dang Ton
*Assistant Examiner*—Phirin Sam
*Attorney, Agent, or Firm*—Jenkens & Gilchrist

[57] ABSTRACT

A method for distinguishing between in-band signaling and user data transmissions of a communication system. The method includes the assignment of separate training bit sequences, one for in-band signaling transmissions and another for user data transmissions. During transmission, the training bit sequence associated with the type of transmission being sent is used as the training bit sequence. The method further includes the correlation of the received training bit sequence with both the training bit sequence assigned to in-band signaling and the training bit sequence assigned to user data. The training bit sequence having the highest correlation energy indicates the type of data contained in the communication transmission.

4 Claims, 4 Drawing Sheets

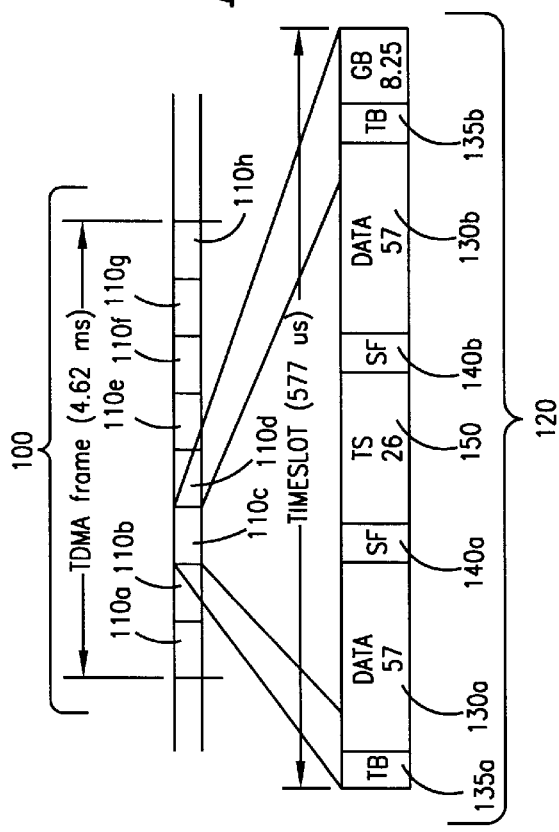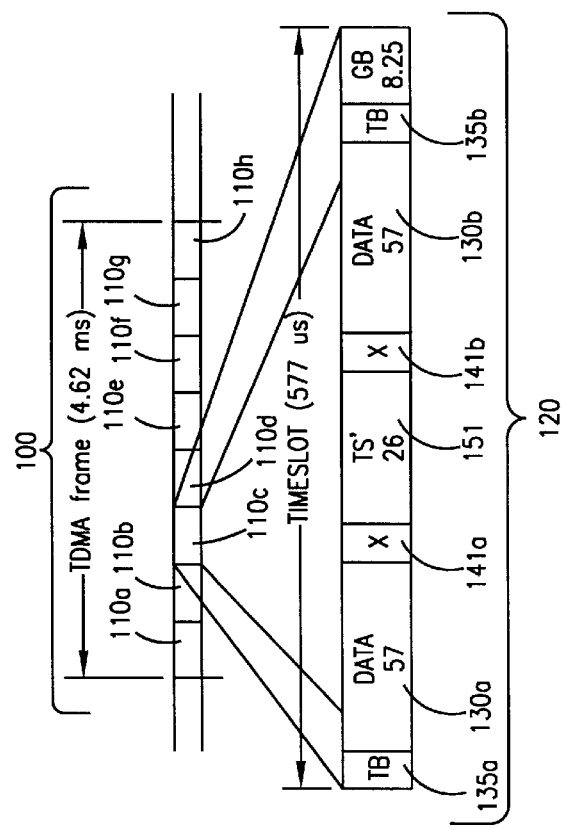

METHOD AND APPARATUS FOR DISTINGUISHING IN-BAND SIGNALING FROM USER DATA

BACKGROUND OF THE INVENTION

1. Technical Field of the Invention

The present invention pertains in general to a method for distinguishing between control signaling and user data, and more particularly, to a method for distinguishing between in-band signaling and user data in a communication channel of a communication system.

2. Description of Related Art

In a given communication network conforming to any one of a number of communication network protocols, there are two broadly defined types of transmissions. The first type is referred to as "user data." User data comprises communication messages which are the intended subject of the communication network and include speech, facsimile data, and electronic data, among others. The second type of transmission is control signaling which is communicated via the communication network in order to control the functioning of the network. Control signaling is a part of the overhead necessary to implement the communication system. Typically, communication network protocols are designed to accommodate both types of transmissions over the same physical communication channel while at the same time maintaining separation between them using different logical channels.

In the Global System for Mobile communications (GSM) standard, user data is transmitted over a traffic channel while a portion of the control signaling is transmitted over a different logical channel called a Slow Associated Control Channel (SACCH). Situations occur, however, where the Slow Associated Control Channel does not have the bandwidth necessary to facilitate transmission of all the control information. Examples of when this might occur include DTMF signaling, providing supplementary services, and handoff directives.

In the case of a handoff directive, for example, a telephone conversation needs to be handed over from one base station to another. This handoff requires a large amount of control information to suddenly be communicated over the communication network. The Slow Associated Control Channel is incapable of transmitting the requisite large amount of information and therefore a Fast Associated Control Channel (FACCH) implemented on the logical channel comprising the traffic channel is used to transmit the signaling information necessary to effectuate the handover in place of a 20 millisecond segment of speech. This substitution of control signaling for user data is commonly referred to as in-band signaling. While in-band signaling does not seriously degrade the quality of the user data transmission, it places additional overhead on the communication system.

Since the substitution of control signaling for user data occurs at random time periods from the perspective of the receiver, a method to distinguish between user data and in-band signaling is required. In the GSM standard, user data is distinguished from in-band signaling through the use of a "stealing flag" bit, which is associated with each 57 bits of encrypted user data. Two 57 bits of encrypted data along with two stealing flag bits and other control bits form what is referred to as a normal burst. Four such normal bursts taken together form a Fast Associated Control Channel. Although this solution in GSM is relatively simple to implement, the bits which are used for stealing flags are lost to other uses and become fixed overhead of the overall communication system, thereby decreasing the bandwidth available for user data.

There is a need, therefore, for a method of distinguishing between in-band signaling and user data which does not unnecessarily waste communication bits.

SUMMARY OF THE INVENTION

The present invention comprises a method and apparatus for distinguishing between in-band signaling and user data by assigning different training bit sequences for in-band signaling transmissions associated with the Fast Associated Control Channel and user data transmissions. This dual assignment replaces the single training bit sequence which is currently used in Global System for Mobile communication based systems. The two training bit sequences are assigned at the setup of a traffic channel and are processed by the receiver correlator. Instead of conducting a correlation against a single training bit sequence as is currently done, the correlator of the present invention is directed to correlate against both the training bit sequence assigned to in-band signaling and the training bit sequence assigned to user data and to treat the transmission as the type of data which is associated with the training bit sequence having the highest correlation energy level.

BRIEF DESCRIPTION OF THE DRAWINGS

For a more complete understanding of the present invention, reference is made to the following detailed description taken in conjunction with the accompanying drawings wherein:

FIG. 1A is an illustration of the fields comprising a time slot within a Time Division Multiple Access frame of a GSM based communication system;

FIG. 1B is an illustration of the fields comprising a time slot within a Time Division Multiple Access frame of a GSM based communication system embodying the present invention;

DETAILED DESCRIPTION OF THE INVENTION

Figure 2:
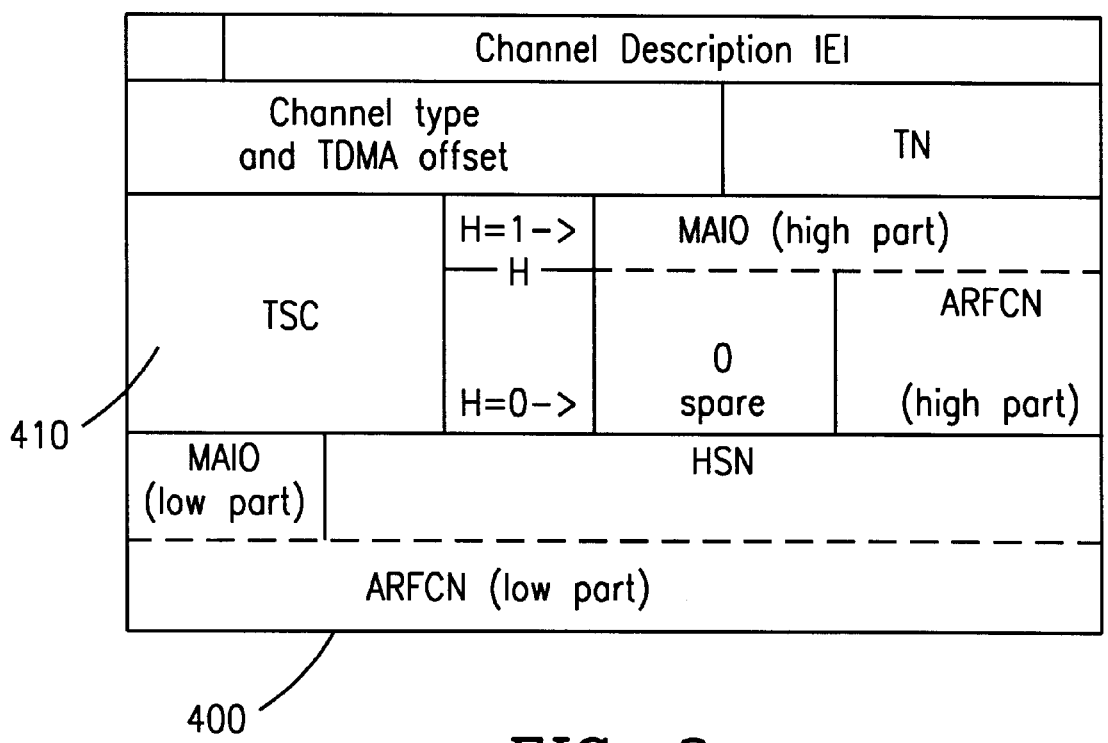
FIG. 2 is an illustration of a subset of the various fields used during call setup including a three bit Training Sequence Code.

In a Global System for Mobile communications GSM based communication system, a number of carriers, each separated from adjacent carriers by 200 KHz are used for digital transmissions. Each carrier is shared by a number of users through the use of Time Division Multiple Access (TDMA) techniques. Using TDMA, a carrier is divided in time into separate TDMA frames where each TDMA frame is split into eight time slots which are further divided into 156.25 symbols. Each TDMA frame is approximately 4.62 milliseconds in duration and each TDMA time slot spans approximately 577 microseconds.

Referring now to FIG. 1, there is illustrated various fields comprising a time slot within a TDMA frame of a GSM based communication system. Each TDMA frame 100 comprises eight time slots 110A–110H. A TDMA burst 120 is transmitted within a single time slot 110 period and includes two fifty-seven bit wide data fields 130A and 130B, two steal flag bits 140A and 140B, and two, three bit wide tail bits 135A and 135B. The steal flags 140A and 140B are either a logical "1" or a "0" signifying whether the data fields 130A and 130B contain user data or contain control signaling for use in a Fast Associated Control Channel.

Also contained within the TDMA burst 120 is a training bit sequence field 150. This twenty six-bit field is primarily used for two purposes. First it allows the receiver to maintain accurate timing with respect to the base station transmitter. Second, the training bit sequence field 150 is used to transmit a known preassigned bit pattern used by a Viterbi equalizer to create a channel model for estimating the characteristics of the radio frequency channel. This equalization is well known in the industry and can be viewed as a tool to correct distortion of the transmitted signal which has been imposed by the transmission media.

When in-band signaling occurs using the Fast Associated Control Channel, user data in the two data fields 130A and 130B of four bursts 120 are exchanged with control signaling. These four bursts 120, whether containing user data or control signaling, total eight data fields and are referred to as one speech frame. When the speech frame contains control information it forms the Fast Associated Control Channel. Again, the steal flags associated with the speech frame determine whether the data is control signaling or user data.

The method of distinguishing in-band signaling from user data of the present invention uses the pre-allocated and known training bit sequence field 150. In the GSM standard, there are currently eight available training bit sequences for assignment to the training bit sequence 150 of any given traffic channel. When a traffic channel is allocated in GSM, a training bit sequence 150 is chosen from among the eight available and is transmitted as a three bit Training Sequence Code parameter representing a binary number identifying the sequence during the call setup procedure. Since the bit sequence is known by both the transmitter and the receiver, it can be used for synchronization purposes and also be used by a Viterbi equalizer to correct for distortions in the transmitted signal. When the receiver receives the incoming burst transmission, it attempts to correlate the down-converted and sampled radio frequency (RF) input signal with the preassigned training bit sequence transmitted during the traffic channel setup procedure using a correlator. This process and the correlator used are well known to the industry. While a minimum of one correlation needs to be conducted, in reality, several correlations are needed in order to maintain accurate timing. The correlation window is typically 5–10 symbols. A smaller correlation window is not possible due to the quick variations on the radio frequency channel media from burst to burst.

Referring now to FIG. 1B, there is illustrated the fields comprising a time slot within a Time Division Multiple Access frame of a GSM based communication system embodying the present invention. To distinguish in-band signaling from user data, the method of the present invention increases the number of training bit sequences from eight to sixteen and forms eight pairs of available training bit sequences for use in the training bit sequence field 151. The same three bit Training Sequence Code parameter currently used to identify a training bit sequence during the call setup procedure is used with the understanding that the three bit parameter identifies not a single predefined training bit sequence but rather a pair of predefined training bit sequences. One training bit sequence is used to indicate the presence of user data in the data fields of the time slot 130A and 130B, while the other training bit sequence is used to indicate the presence of control signaling of the Fast Associated Control Channel. Since the training bit sequence 151 used to distinguish between in-band signaling and user data, the stealing flag bits 140A and 140B of FIG. 1, become empty fields 141A and 141B which are available for other uses.

Using the method of distinguishing between in-band signaling and user data of the present invention, the receiver performs correlations against two training bit sequences instead of one. As with correlations against one training bit sequence, multiple correlations maybe necessary. The type of transmission received, either user data or in-band signaling, is determined by selecting the type of transmission associated with the training bit sequence producing the highest correlation energy. The measurement of correlation energy can either be instantaneous or alternatively, calculated over a window of time where the energy is accumulated from a number of adjacent correlations.

Referring now to FIG. 2, there is illustrated a subset of the various fields used during call setup, including a three bit Training Sequence Code. When a call is initiated, information regarding the description of the communication channel is transmitted during the call setup in the channel description 400. One of the fields in the channel description is the Training Sequence Code (TSC) 410. The Training Sequence Code field 410 is coded as the binary representation of the training bit sequence code to be used for the call being initiated. In the current GSM protocol, the Training Sequence Code identifies a single training bit sequence whereas in the current invention the Training Sequence Code identifies a pair of training bit sequences with one indicative of user data and one indicative of in-band signaling.

Figure 3:
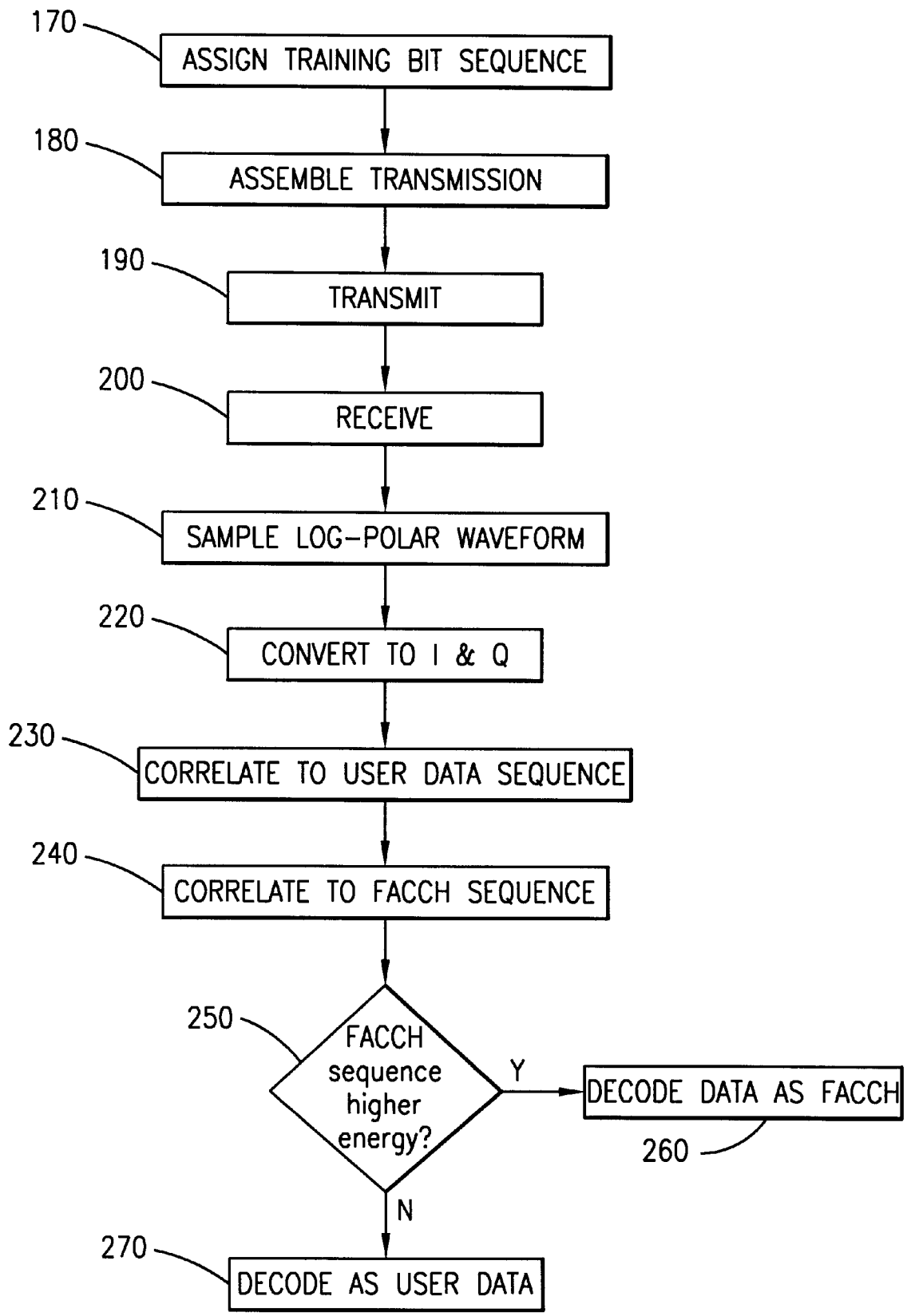
FIG. 3 is a flow diagram implementing the method of distinguishing in-band signaling from user data of the present invention.

Referring now to FIG. 3, there is illustrated a flow diagram for implementing a method of the preferred embodiment for distinguishing in-band signaling from user data of the present invention. The flow diagram and the description thereof, assumes that the eight single training bit sequences of the current GSM based system have been replaced with the eight training bit sequence pairs of the present invention. During the setup of a call, the base station assigns a training bit sequence pair (step 170) and the transmitting party assembles a frame using the training bit sequence associated with the type of data being transmitted (step 180). The transmitting party then transmits the message (step 190) and the receiving party receives the message (step 200). The receiver of the mobile station performs a log-polar sampling of the received waveform (step 210). The receiver converts the log-polar sampled signal into a digital representation of I (in-phase) and Q (quadrature phase) parameters well known in the industry (step 220) for input to a digital signal processor. The training bit sequence is correlated with a preassigned user data sequence (step 230) and is also correlated with a preassigned Fast Associated Control Channel sequence (step 240), both correlations using a standard correlator. The correlations must be performed at least once yielding an instantaneous correlation energy measurement or alternatively, may be repeated a number of times to yield an accumulated correlation energy measurement. Once the correlation steps 230 and 240 are complete, the receiver determines whether the correlation energy of the Fast Associated Control Channel or the correlation energy of the user data sequence is higher (step 250). If the Fast Associated Control Channel correlation energy is higher, the data fields 130A and 130B of FIG. 1, within the speech frame are decoded as in-band signaling (step 260). Otherwise, the data fields 130A and 130B of FIG. 1 within the speech frame are decoded as user data (270).

As an alternative approach to distinguishing between the two training bit sequences of the present invention, a Maximum Likelihood Sequence Estimation MLSE demodulator running a Viterbi algorithm is used to demodulate an incoming signal represented by digitized I (in-phase) and Q (quadrature phase) parameters. The Maximum Likelihood Sequence Estimation demodulator is run in two separate passes, each pass assuming a different one of the two potential training sequences. For each pass, the maximum likelihood sequence estimation demodulator produces a best accumulated metric. The pass resulting in the best accumulated metric indicates the training sequence most likely to be present in the received burst. The Viterbi algorithm used for this exhaustive search in Maximum Likelihood sequence Estimation detection is well known in the industry.

Figure 4:
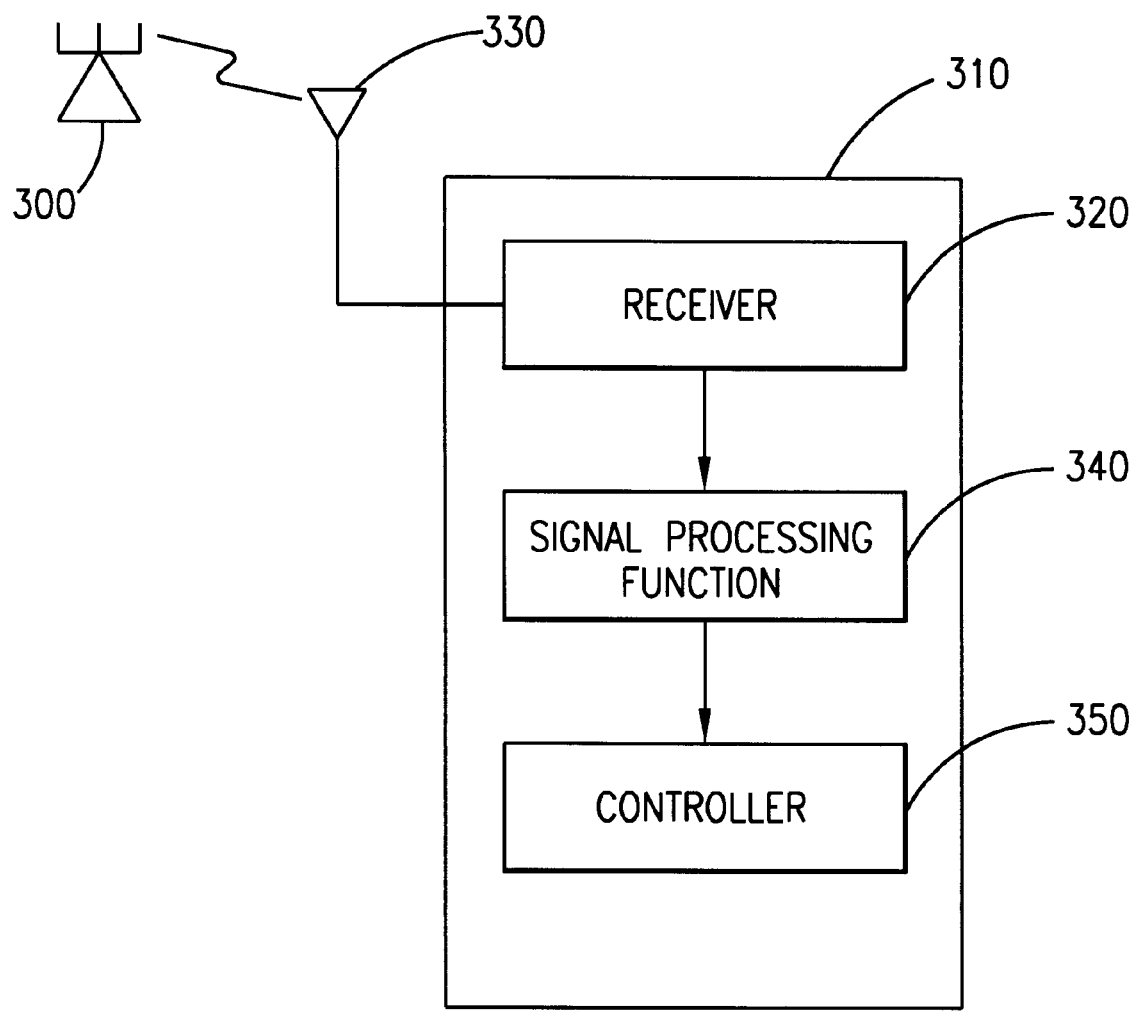
FIG. 4 is a functional block diagram of a mobile communication system incorporating an embodiment of the present invention.

Referring now to FIG. 4 there is illustrated a functional block diagram of a mobile communication system incorporating the preferred embodiment of the present invention. During call setup, base station 300 specifies to the mobile station 310 the pair of training bit sequences to be used via the three bit Training Sequence Code 410 of FIG. 2. During a transmission by the base station, the receiver 320 of the mobile station 310 receives transmissions from the base station 300 via antenna 330. The receiver 320 performs a log-polar sampling of the received waveform and converts the signal into I (in-phase) and Q (quadrature phase) parameters and the signal processing function 340 correlates the training bit sequence with the training bit sequences representing user data and in-band signaling to determine whether the data fields 130A and 130B of FIG. 1 contain user data or in-band signaling. The determination as to wether the data fields contain user data or in-band signaling is communicated to the controller 350 of the mobile station. Although not shown, the same process occurs at the base station when the mobile station is the transmitting party.

Since the present invention allows in-band signaling to be distinguished from user data without the use of the stealing bit flags 140A and 140B both of FIG. 1, these bits are available to be used for other purposes. The overhead of using these bits as stealing bit flags is eliminated and the bandwidth of the overall communication system is increased.

Although the preferred embodiment of the method and apparatus of the present invention have been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. An apparatus for distinguishing between in-band signaling and user data in a communication transmission comprising:

a receiver for receiving the communication transmission; and a digital signal processor for correlating a transmitted training bit sequence included in the communication transmission with a training bit sequence indicative of user data and further correlating the transmitted training bit sequence with a training bit sequence indicative of in-band signaling, and the digital signal processor further for identifying the communication transmission as user data if the transmitted training bit sequence correlates to the training bit sequence indicative of user data, otherwise, identifying the communication transmission as in-band signaling if the transmitted training bit sequence correlates to the training bit sequence indicative of in-band signaling.

2. The apparatus of claim 1, further comprising:

a sampling means for performing a log-polar sampling of the communication transmission received by the receiver, and the sampling means further for creating a log-polar sampled signal; and a converting means for converting the log-polar sampled signal created by the sampling means into a digital representation of in-phase and quadrature phase parameters of the transmitted training bit sequence for use by the digital signal processor when correlating the training bit sequence.

3. An apparatus for distinguishing between in-band signaling and user data in a communication transmission comprising:

a receiver for receiving the communication transmission, the communication transmission containing a training bit sequence;

a sampling means for preforming a log-polar sampling of the communication transmission received by the receiver, and the sampling means further for creating a log-polar sampled signal;

a converting means for converting the log-polar sampled signal created by the sampling means into a digital representation of in-phase and quadrature phase parameters;

a correlator for correlating the in-phase and quadrature phase parameters representing the transmitted training bit sequence with a training bit sequence indicative of user data to measure a first correlation energy level, and the correlator further correlating the in-phase and quadrature phase parameters with a training bit sequence indicative of in-band signaling to measure a second correlation energy level; and a controller to compare the first correlation energy level measured by the correlator with the second energy level measured by the correlator to determine the communication transmission to contain user data if the first correlation energy level is greater than the second correlation energy level, otherwise determining the communication transmission to contain in-band signaling if the second correlation energy level is greater than the first correlation energy level.

4. A method for distinguishing between in-band signaling and user data in a communication transmission using dual training bit sequences, the method comprising the steps of:

receiving the communication transmission;

correlating a transmitted training bit sequence contained within the received communication transmission with a training bit sequence indicative of user data to measure a first correlation energy level;

correlating the transmitted training bit sequence with a training bit sequence indicative of in-band signaling to measure a second correlation energy level;

comparing the first correlation energy level with the second correlation energy level to determine the training bit sequence having the higher correlation energy level; and identifying the communication transmission as containing the type of data associated with the training bit sequence having the higher correlation energy level.

* * * * *